United States Patent
Puluso

(10) Patent No.: US 6,401,998 B1
(45) Date of Patent: Jun. 11, 2002

(54) GOLF BAG TRANSPORTATION APPARATUS FOR VEHICLES

(76) Inventor: Thomas M. Puluso, 5983 Meadowsglen Dr., Dublin, OH (US) 43017

(*) Notice: Subject to any disclaimer, the term of this patent is extended or adjusted under 35 U.S.C. 154(b) by 0 days.

(21) Appl. No.: 09/773,871

(22) Filed: Feb. 2, 2001

(51) Int. Cl.$^7$ .................................................. B62J 7/00
(52) U.S. Cl. .................. 224/422; 224/413; 224/431; 224/450; 224/451; 224/460
(58) Field of Search ................................ 224/413, 422, 224/431, 441, 447, 450, 451, 452, 454, 455, 460

(56) References Cited

U.S. PATENT DOCUMENTS

| | | | | |
|---|---|---|---|---|
| 2,613,952 A | * | 10/1952 | Lannon | 206/315.4 |
| 3,142,424 A | * | 7/1964 | Reed, Jr. | 224/422 |
| 3,167,284 A | * | 1/1965 | Lynch | 224/422 |
| 3,286,891 A | | 11/1966 | Jones, Jr. | |
| 3,938,719 A | | 2/1976 | Carlton | |
| 4,296,878 A | * | 10/1981 | Ward et al. | 224/422 |
| 4,387,836 A | * | 6/1983 | Laesch | 224/412 |
| 4,770,326 A | * | 9/1988 | Thompson | 224/422 X |
| 5,207,361 A | | 5/1993 | Slifka | |
| 5,468,006 A | * | 11/1995 | Delserro | 280/202 |
| 5,687,894 A | * | 11/1997 | Cavallaro | 224/448 |
| 6,273,391 B1 | * | 8/2001 | Engolia | 224/422 |

* cited by examiner

Primary Examiner—Stephen K. Cronin
(74) Attorney, Agent, or Firm—Kremblas, Foster, Phillips & Pollick

(57) ABSTRACT

A carrier for attachment to a motor vehicle is provided. In accordance with this invention a carrier is provided for attachment to a motor vehicle, with the carrier having a backplate, a mounting plate and an axle adapter. The backplate has an upright member and a base portion. The upright member also has a projection extending therefrom and at least one retention plate secured thereto. The mounting plate has cooperative retention means and an aperture through which the aforesaid projection extends. The upright member of the backplate is secured to the mounting plate by fastening means. The mounting plate is secured to the axle adapter, such that the axle adapter causes the carrier to be secured to the rear axle of a motor vehicle. Preferably, the backplate has a handle portion inclined relative to the upright member. The base portion preferably has a kickstand and a wheel bracket attached thereto, both of which have a first position and a second position, with the first position for each being recessed in the base portion, and with the second position for each being downwardly so that the kickstand and wheels, respectively, extends below the base portion.

20 Claims, 4 Drawing Sheets

GOLF BAG TRANSPORTATION APPARATUS FOR VEHICLES

FIELD OF THE INVENTION

The present invention relates generally to a means for transporting a golf bag on a vehicle, and more particularly, to an apparatus designed for use on a motorcycle or other similar vehicle.

BACKGROUND OF THE INVENTION

This invention is directed to the providing of a way for transporting a golf bag on a motorcycle or other similar vehicle, where the driver has chosen not to drive a car, van or truck. Some individuals enjoy riding motorcycles, motor scooters, or other motorized vehicles. For some, this is because of economic or environmental considerations. For others, motorcycle riding is exhilarating. Still for others, there is a freedom associated with such means of transportation.

However, motorcycle riding is not devoid of problems. This is especially the case for sports devotees. For example, golfers encounter the particular problem of how to transport their golf bag on a motorcycle. Many proposed solutions have been put forth. Some, such as Jones, U.S. Pat. No. 3,286,891, locate the golf bag carrier behind the vehicle with some sort of fender attachment. However, there are safety concerns which currently would preclude the placement of a golf bag carrier in the location shown in Jones.

Another proposed solution is shown in Slifka, U.S. Pat. No. 5,207,361, where the carrier takes the form of a single plate secured to a sheath-like member which encases one of the foot pegs of the motorcycle. The golf bag is held in place on the relatively horizontal carrier by a plurality of elasticized cords. When it is desired to use the golf bag, the bag must be removed from the carrier and carried either around the course or at least to a hand-pulled or motorized golf cart. Then, when golfing is completed, the golf bag must be replaced atop the carrier and the plurality of straps again secured in place.

Still another proposed solution is shown in Carlton, U.S. Pat. No. 3,938,719, where a carrier is provided that is secured to a suitable frame structure that extends upwardly from the axle of the front wheel of a motorcycle. The carrier has a plate member which is secured atop a support member, which in turn is secured to the vehicle frame. In one embodiment an upright framing member is secured to the plate member, and a golf bag could be slidably placed within the framing member. Alternatively, other embodiments disclose containers which are secured atop the plate member in addition to being secured by means of an elasticized cord to the handlebars of the vehicle. A golf bag could be slidably placed into either type of container. When it is desired to use the golf bag, the bag must be removed from the carrier and carried either around the course or a least to a hand-pulled or motorized golf cart.

It is thus apparent that th need exists for an improved device to be used in transporting a golf bag on a motorcycle or other similar vehicle.

SUMMARY OF THE INVENTION

In accordance with this invention a carrier is provided for attachment to a motor vehicle, with the carrier having a backplate, a mounting plate and an axle adapter. The backplate has an upright member and a base portion. The upright member also has projection extending therefrom and at least one retention plate secured thereto. The base portion has n aperture formed therein.

The mounting plate has cooperative retention means and an aperture through which the aforesaid projection extends. The upright member of the backplate is secured to the mounting plate by fastening means. The mounting plate is secured to the axle adapter, such that the axle adapter causes the carrier to be secured to the rear axle of a motor vehicle.

The backplate has a handle portion, which in the preferred embodiment of the invention is inclined relative to the upright member. The upright member has a plurality of slots formed therein, with the slots having retaining means pass therethrough for securing an object to the carrier. One type of object which can be transported using this invention is a golf bag.

The base portion has a base upper surface and a base lower surface with a plurality of apertures formed so as to completely extend between the surfaces. Preferably, the base portion has a kickstand attached thereto. The kickstand has a first position and a second position, with the first position being recessed in the base portion, and with the second position being downwardly so as to extend below the base portion. Preferably, the base portion has wheels attached thereto. The wheels are attached to a wheel bracket, with the wheel bracket having a first position and a second position, with the first position being recessed in the base portion, and with the second position being downwardly so the wheels extend below the base portion.

There is also disclosed a carrier for attachment to a motor vehicle, with the carrier having a backplate, a moving plate and an axle adapter. The axle adapter has a female end for attachment to the axle bolt of a vehicle, a male portion for attachment to the mounting plate, and an end cap. The backplate has an upright member and a base portion, with the upright member having a projection extending therefrom and at least one retention plate secured thereto. The backplate has a handle portion, and in the preferred embodiment of the invention it is inclined relative to the upright member. The upright member also has a plurality of slots formed therein, with the slots having retaining means pass therethrough for securing an object to the carrier. One type of object which can be secured to the carrier is a golf bag. The base portion has an aperture formed therein.

The mounting plate has cooperative retention means and an aperture through which the projection extends, with the upright member of the backplate being secured to the mounting plate by fastening means. The mounting plate is secured to the axle adapter, such that the axle adapter causes the carrier to be secured to the rear axle of a motor vehicle.

The base portion has a base upper surface and a base lower surface with a plurality of apertures formed so as to completely extend between the two surfaces. The base portion has a kickstand attached thereto, with the kickstand having a first position and a second position, with the first position being recessed in the base portion, and with the second position being downwardly so as to extend below the base portion. The base portion also preferably has wheels attached thereto, with the wheels being attached to a wheel bracket. The wheel bracket has a first position and a second position, with the first position being recessed in the base portion, and with the second position being downwardly so the wheels extend below the base portion.

There is also disclosed a carrier for attachment to a motor vehicle, with the carrier having a backplate, a mounting plate, and an axle adapter. The backplate has an upright member and a base portion, with the upright member having a projection extending therefrom and at least one retention plate secured thereto. The upright member also preferably has a plurality of slots formed therein, with the slots having retaining means pass therethrough for securing an object, such a a golf bag, to the carrier. The base portion has an aperture formed therein.

The mounting plate has cooperative retention means and an aperture through which the projection extends, with the upright member of the backplate being secured to the mounting plate by fastening means. The axle adapter has a female end for attachment to the axle bolt of a vehicle a male portion for attachment to the mounting plate, and an end cap, with the mounting plate being secured to the axle adapter, such that the axle adapter causes the carrier to be secured to the rear axle of the motor vehicle.

The primary objective of this invention is to provide a carrier that permits objects such as a golf bag to be transported on motor vehicles such as motorcycles.

Another object is to provide a carrier which is of relatively economical construction and which is relatively easy to fabricate.

Other objects and advantages of the invention will be apparent from the following description, the accompanying drawings, and the appended claims.

DETAILED DESCRIPTION OF THE DRAWINGS

Figure 1:
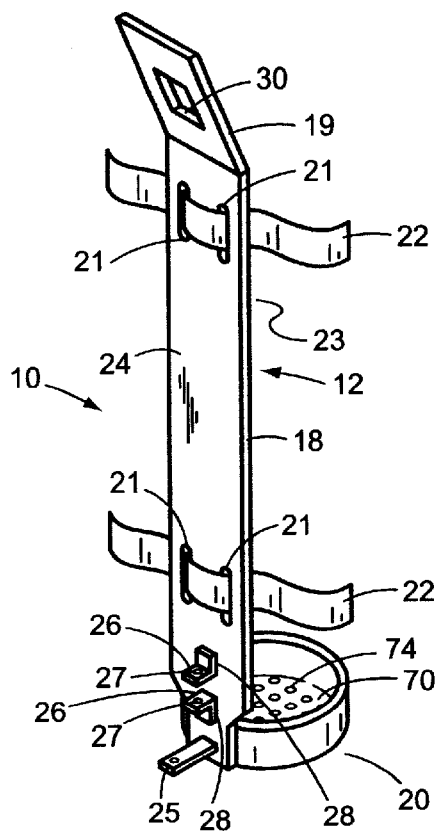
FIG. 1 is a perspective view of the backplate component of the carrier made in accordance with the present invention.

Having reference to the drawings, attention is directed first to FIG. 1 which discloses one of the main components of a carrier made in accordance with this invention, with the carrier designated generally by the numeral 10. The portion of the carrier shown in FIG. 1 is the backplate 12. The other two main components can be appreciated from a comparison of FIG. 1 with FIG. 7 as being a mounting plate 14 and an axle adapter 15.

Figure 2:
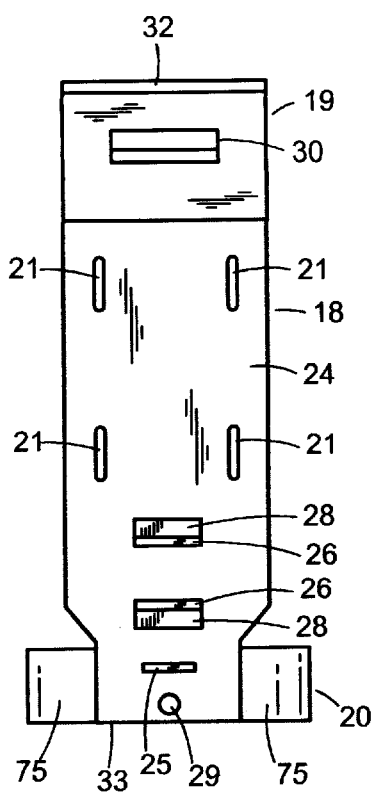
FIG. 2 is an elevational view on a greatly enlarged scale of the surface of the backplate shown in FIG. 1.
Figure 4:
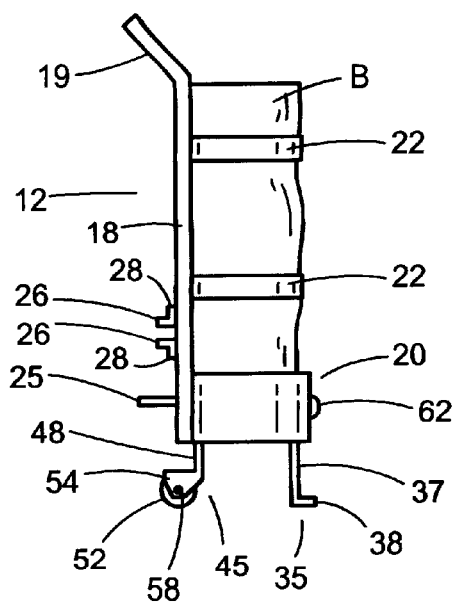
FIG. 4 is a side elevation of the backplate component when the carrier is in use, yet detached from a motor vehicle.

As can be appreciated from a comparison of FIGS. 1, 2, and 4, the backplate 12 is comprised of an upright portion 18, a handle portion 19, and a base portion 20. The upright portion 18 is shown as having four slots 21, although the actual number could vary. The slots 21 enable retention means 22 to secure an item, such as a golf bag B, to the carrier 10. Although the retention means 22 are shown as being straps, other suitable means of securement could be used.

The upright portion 18 has a first surface 23 and a second surface 24. Near the bottom of the upright portion 18, a projection 25 extends from the second surface 24, preferably perpendicular thereto. Spaced a distance above the projection 25 is at least one and preferably two retention plates 26, with each retention plate having formed therein a retention plate aperture 27. To assist in the securing of each retention plate 26 to the upright portion 18, a retention plate support plate 28 is provided, with the retention plate support plate 28 secured to the upright portion 18 and to the retention plate 26. For optimal strength, the retention plate and the retention plate support plate could be fabricated as a single unit, such as from angle iron. Below the projection 25 is a base portion aperture 29.

The height-of the upright member in the preferred embodiment is 38". The width of the upright member at its top is 5½". At the backplate bottom 33, the width of the upright member is 3½", with this width extending upwardly 5", at which point the sides of the upright member taper outwardly. Each of the slots 21 provided for retention means is spaced inwardly from closest edge of the upright member a distance of ½". The top of the upper slot is spaced about 2" below the juncture of the handle portion, while the top of the lower slot is about 15½" above the backplate bottom 33. Each slot is preferably 1½" tall by ¼" wide.

As shown, the lower surface of the bottom retention plate is spaced 6¼" above the backplate bottom. The distance between the retention plates is about 1½", and they are centered on the vertical axis of the upright member. The projection 25 is located about 2" above the backplate bottom, is centered on the vertical axis of the upright member, and is 1¼" wide and 2¼" long. The base portion aperture is drilled ¾" from the backplate bottom, is centered on the vertical axis of the upright member and is ⅜" in diameter.

The handle portion 19 is preferably inclined relative to the upright member 18. To assist in the grasping of the carrier 10, a handle aperture 30 is provided. The width of the handle portion is the same as that portion of the upright member to which it is directly adjacent, namely 5½". The handle portion in the preferred embodiment of the invention extends upwardly from the upright member a distance of 6" at an angle of 45°, with the handle aperture itself being 2" tall and 4½" wide and spaced 1¼" from the backplate top 32. In the preferred embodiment of the invention, the upright member and handle portion are fabricated from a unitary ¼" thick piece of aluminum.

Figure 3:
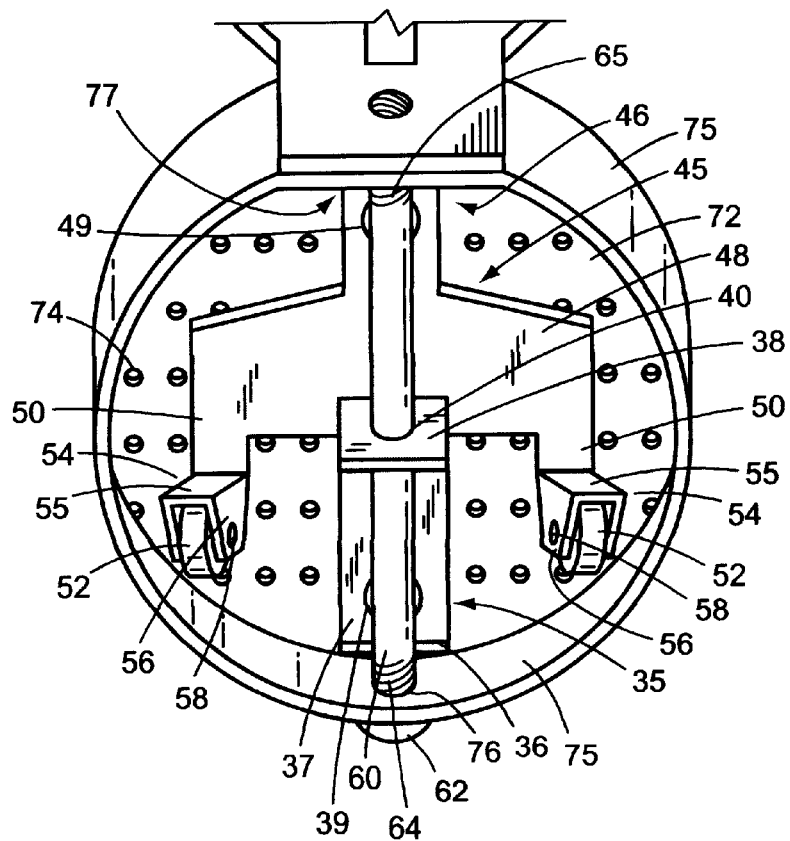
FIG. 3 is a perspective view on a greatly enlarged scale of the bottom of the backplate shown in FIG. 1.

To assist in stabilizing the carrier once it is removed from the motor vehicle to which it is attached during the transportation mode, a kickstand 35 is provided as can be appreciated from a comparison of FIGS. 3 and 4. The kickstand is preferably fabricated from a ⅛" thick piece of aluminum. The kickstand 35 is secured to the lower surface of base portion 20 by a hinge 36 that extends the 2" width of the kickstand. The kickstand 35 has a first planar portion 37 approximately 6" in length, and a second planar portion 38 approximately 2" in length, with the two portions being essentially perpendicular to each other.

A first planar portion aperture 39, ⅜" in diameter, is provided for use when the kickstand is in use, in order to prevent pivoting movement of the kickstand. A second planar portion aperture 40, also ⅜" in diameter, is provided for use when the kickstand is in the up position as shown in FIG. 3, in order to prevent the kickstand from accidentally coming into contact with objects on the road surface, or the road surface itself, during transit.

A comparison of FIGS. 3 and 4 also disclose the wheel bracket 45. It too is secured to the base portion by a wheel bracket hinge 46. The wheel bracket 45 has a wheel bracket plate 48 having a generally Y-shape, with the base of the Y being 2½" in width and 2⅝" tall. The edge-to-edge width of the Y is 9", with the two arms 50 each being 1½" in width, such that their facing edges are spaced 6" apart.

Each arm 50 has wheels 52 attached thereto at wheel mounts 54 which are 1" from the top of the Y's cross-bar, with that 1" corresponding to the length of the facing edges of the two arms. As shown best in FIG. 3, the wheel bracket has a wheel plate aperture 49, ⅜" in diameter. It may be appreciated that the aperture is centered on the vertical axis of the wheel bracket when the bracket is in the position as shown in FIG. 4. Each wheel mount 54 has a top surface 55 which is 1½" deep and side walls 56 which are 1¾" tall. The wheels 52 are held on the wheel mounts 54 by axles 58. The choice of wheel size is made so that the carrier has stability when supported on just the wheels and the kickstand.

As can best be appreciated from a comparison of FIGS. 3 and 4, a locking rod 60 is also provided to assist in locking the kickstand and wheel bracket into the positions shown in FIGS. 3 and 4 respectively. The locking rod is about ⅜" in diameter and 10⅝" long, exclusive of the handle 62, which is shown as being spherical, although other shapes could be used. The rod has a threaded first end 64 and a threaded second end 65. The first end 64 is secured to the rod handle. The second end 65 is to be secured to the base portion 20 as will be discussed below.

The base portion 20 can best be appreciated from a comparison of FIGS. 1–4. It has a base upper surface 70 and a base lower surface 72, with a plurality of base apertures 74, each preferably ¼" in diameter, extending therebetween. The outer diameter of the base portion is 10⅜". In the preferred embodiment of the invention, base sidewall 75 and base surface 70,72 is formed from ⅛" thick aluminum. The base sidewall 75 has a base sidewall first aperture 76, which need not be threaded, and a base sidewall second aperture 77, which is threaded and into which the threaded second end portion 65 of the locking rod 60 passes.

Figure 5:
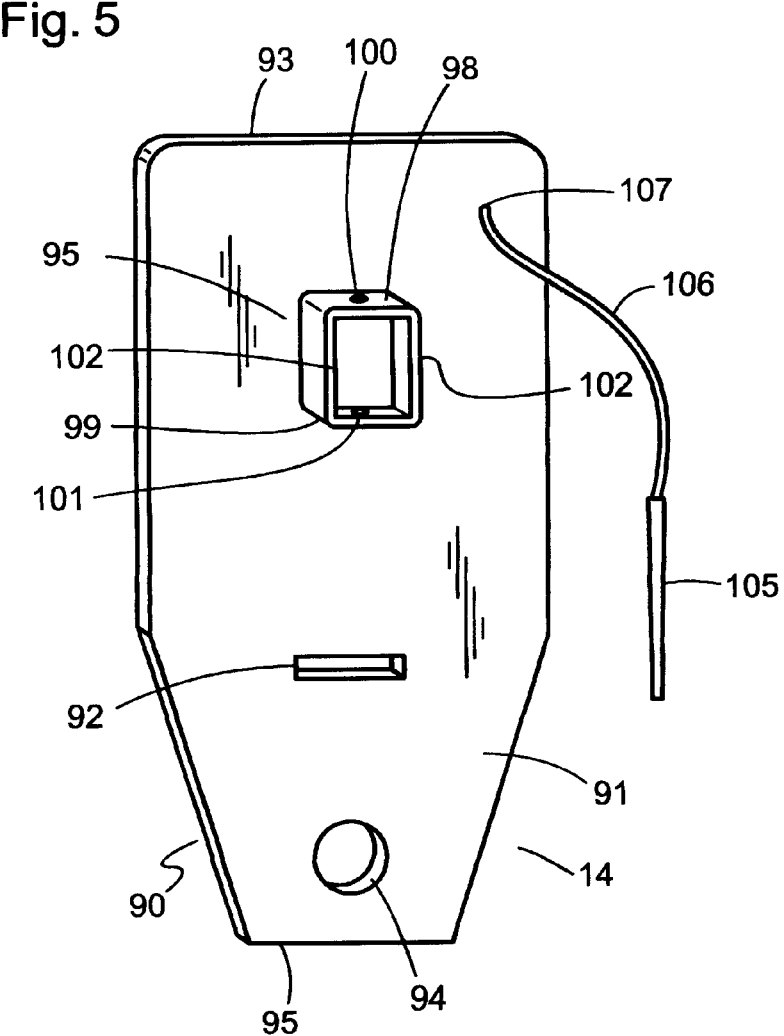
FIG. 5 is a perspective view on a greatly enlarged scale of the mounting plate component of the carrier made in accordance with the present invention.
Figure 7:
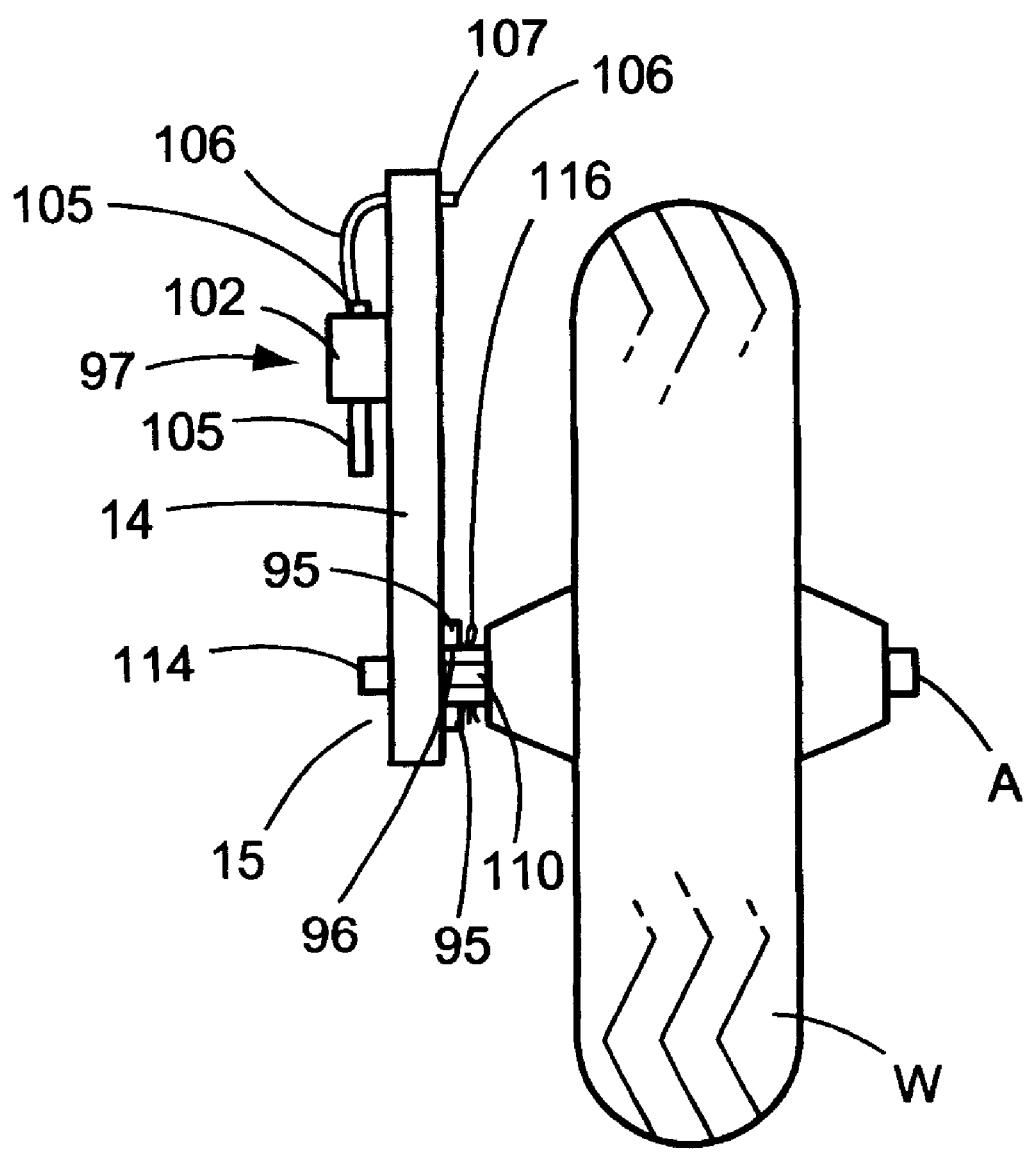
FIG. 7 is a rear elevation of the mounting plate and axle adapter attached to a motor vehicle.

The mounting plate 14 can best be appreciated from a comparison of FIGS. 5 and 7. The mounting plate 14 is preferably formed from ⅜" thick aluminum plate and has a mounting plate first surface 90 and a mounting plate second surface 91. The width of the mounting plate is 5½", and its heighth is 14", with the tapering occurring 7" below the top of the mounting plate. A mounting plate first aperture 92 in the form of a horizontal slot 1¼" wide by ¼" tall is centered on the vertical axis of the mounting plate, ¼" below the top 93 of the mounting plate. A mounting plate second aperture 94 in the form of a ⅝" diameter hole is centered on the vertical axis of the mounting plate, 1¾" above the bottom 95 of the mounting plate.

Axle adapter retention means 95 are secured to the mounting plate first surface 90, preferably by welding. Once the axle adapter is secured to the end of the axle, the mounting plate is positioned in place by passing the axle adapter through the mounting plate second aperture 94. The axle adapter retention means has at least two surfaces 96, preferably spaced parallel ones, directly adjacent portions of the outer surface of the axle adapter, so that the mounting plate 14 is precluded from rotating about the axle adapter.

Cooperative retention means 97 are secured to the mounting plate second surface 91, preferably by welding. As shown, there is an retention means upper surface 98 and a retention means lower surface 99, with apertures 100 and 101 respectively. The two surfaces are separated by a pair of sidewalls 102. In the preferred embodiment of the invention, 1½" bar stock is utilized to form the cooperative retention means 97. The retention means upper surface 98 is preferably located 2½" below the top 93.

The apertures 100 and 101 permit the insertion therethrough of fastening means 105. It can take the form of a metal rod, secured to retaining means 106, which could be a strap or chain, and which preferably passes through a retaining means aperture 107 in the mounting plate in order for the fastening means 105 not to be misplaced.

Figure 6:
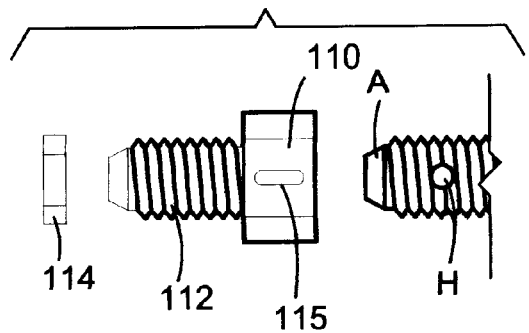
FIG. 6 is a side elevational view on a greatly enlarged scale of the axle adapter component of the carrier made in accordance with the present invention.

As can best be appreciated from a comparison of FIGS. 6 and 7, the axle adapter 15 has a 1" long female component 110 in the form of a hexagonally shaped housing which is screwed onto the existing rear axle bolt of a motor vehicle, such as a motorcycle. Rear axles A have a standard hole H drilled near the end of the rear axle bolt to help in the securing of a cap to the end of the axle. In accordance with the current invention, the female end 110 of the axle adapter 15 is screwed onto the existing axle bolt. The female end has a female component slot 115 extending about half of the length of the female end, and passing completely through the female end from one side to the opposite one. As the female end 110 is secured onto existing axle bolt and tightened, the slot 115 is made to align with the hole H. Thereafter, an adapter retention means 116, such as a cotter pin or other suitable fastener, is passed through the slot 115 and secured as shown in FIG. 7.

The axle adapter also has a 1¼" long male component 112 adjacent the female component 110. The male end 112, also threaded, is of a smaller outer diameter than the outer diameter of the female end 110. A lock nut 114 is provided and is screwed onto the male end 112. In the preferred embodiment of the invention, the lock nut or cap 114 is fabricated from NEOPRENE.

In actual use, as discussed above, the invention has the axle adapter secured to a rear axle of the motor vehicle which will be used to transport the carrier. Then the mounting plate with its aperture 94 is then secured in place as discussed above with respect to the axle adapter retention means and the cap 114 is secured onto the threaded male end 112 of the axle adapter.

The backplate 12 then can be lifted into place against the mounting plate 14. Projection 25 is inserted through aperture 92, and retention plates 27 are placed directly adjacent the cooperative retention means 97. The apertures in the cooperative retention means are aligned with those in the retention plates and the fastening means 437 is passed therethrough into the position shown in FIG. 7, it being understood that FIG. 7 only shows the position of the fastening means relative to the mounting plate, since the backplate is not engaged to the mounting plate in that particular view.

When the golf bag or other carried item arrives at its destination, the carrier permits the easy removal of the bag by unfastening the straps, or the easy removal of the entire backplate by just removing the fastening means 105 from the apertures of the retention plates and cooperative retention means. If the backplate is to be removed, then the locking rod can be unscrewed from its transport position and the kickstand and wheels dropped into their operative position, and the locking rod then reinserted and secured into position.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. A carrier for attachment to a motor vehicle, said carrier comprising
 a backplate, said backplate having an upright member and a base portion, said upright member having a projection extending therefrom and at least one retention plate secured thereto, said base portion having an aperture formed therein,
 a mounting plate, said mounting plate having cooperative retention means and an aperture through which said projection extends, said upright member of said backplate being secured to said mounting plate by fastening means, and
 an axle adapter, said mounting plate being secured to said axle adapter, said axle adapter causing said carrier to be secured to the rear axle of the motor vehicle.

2. The carrier according to claim 1, wherein said base portion has a base upper surface and base lower surface with a plurality of apertures formed so as to completely extend between said surfaces.

3. The carrier according to claim 1, wherein said base portion has wheels attached thereto.

4. The carrier according to claim 1, wherein said axle adapter has a female end for attachment to the axle bolt of a vehicle, a male portion for attachment to said mounting plate, and an end cap.

5. The carrier according to claim 1, wherein said backplate has a handle portion.

6. The carrier according to claim 5, wherein said handle portion is inclined relative to said upright member.

7. The carrier according to claim 1, wherein said upright member has a plurality of slots formed therein, said slots having retaining means pass therethrough for securing an object to said carrier.

8. The carrier according to claim 7, wherein said object is a golf bag.

9. The carrier according to claim 1, wherein said base portion has a kickstand attached thereto.

10. The carrier according to claim 9, wherein said kickstand has a first position and a second position, said first position being recessed in said base portion, said second position being downwardly so as to extend below said base portion.

11. The carrier according to claim 9, wherein said wheels are attached to a wheel bracket, said wheel bracket having a first position and a second position, said first position being recessed in said base portion, said second position being downwardly so said wheels extend below said base portion.

12. A carrier for attachment to a motor vehicle, said carrier comprising
 a backplate, said backplate having an upright member and a base portion, said upright member having a projection extending therefrom and at least one retention plate secured thereto, said upright member having a plurality of slots formed therein, said slots having retaining means pass therethrough for securing an object to said carrier, said base portion having an aperture formed therein,
 a mounting plate, said mounting plate having cooperative retention means and an aperture through which said projection extends, said upright member of said backplate being secured to said mounting plate by fastening means, and
 an axle adapter, said mounting plate being secured to said axle adapter, said axle adapter causing said carrier to be secured to the rear axle of the motor vehicle.

13. The carrier according to claim 12, wherein said object is a golf bag.

14. The carrier according to claim 12, wherein said base portion has a base upper surface and a base lower surface with a plurality of apertures formed so as to completely extend between said surfaces.

15. The carrier according to claim 12, wherein said base portion has a kickstand attached thereto, said kickstand having a first position and a second position, said first position being recessed in said base portion, said second position being downwardly so as to extend below said base portion.

16. The carrier according to claim 12, wherein said base portion has wheels attached thereto, said wheels being attached to a wheel bracket, said wheel bracket having a first position and a second position, said first position being recessed in said base portion, said second position being downwardly so said wheels extend below said base portion.

17. The carrier according to claim 12, wherein said axle adapter has a female end for attachment to the axle bolt of a vehicle, a male portion for attachment to said mounting plate, and an end cap.

18. The carrier according to claim 12, wherein said backplate has a handle portion.

19. The carrier according to claim 18, wherein said handle portion is inclined relative to said upright member.

20. A carrier for attachment to a motor vehicle, said carrier comprising
 a backplate, said backplate having an upright member and a base portion, said upright member having a projection extending therefrom and at least one retention plate secured thereto, said upright member having a plurality of slots formed therein, said slots having retaining means pass therethrough for securing an object to said carrier, said base portion having an aperture formed therein,
 a mounting plate, said mounting plate having cooperative retention means and an aperture through which said projection extends, said upright member of said backplate being secured to said mounting plate by fastening means, and
 an axle adapter, said axle adapter having a female end for attachment to the axle bolt of a vehicle, a male portion for attachment to said mounting plate, and an end cap, said mounting plate being secured to said axle adapter, said axle adapter causing said carrier to be secured to the rear axle of the motor vehicle.

* * * * *